Patented Sept. 9, 1947

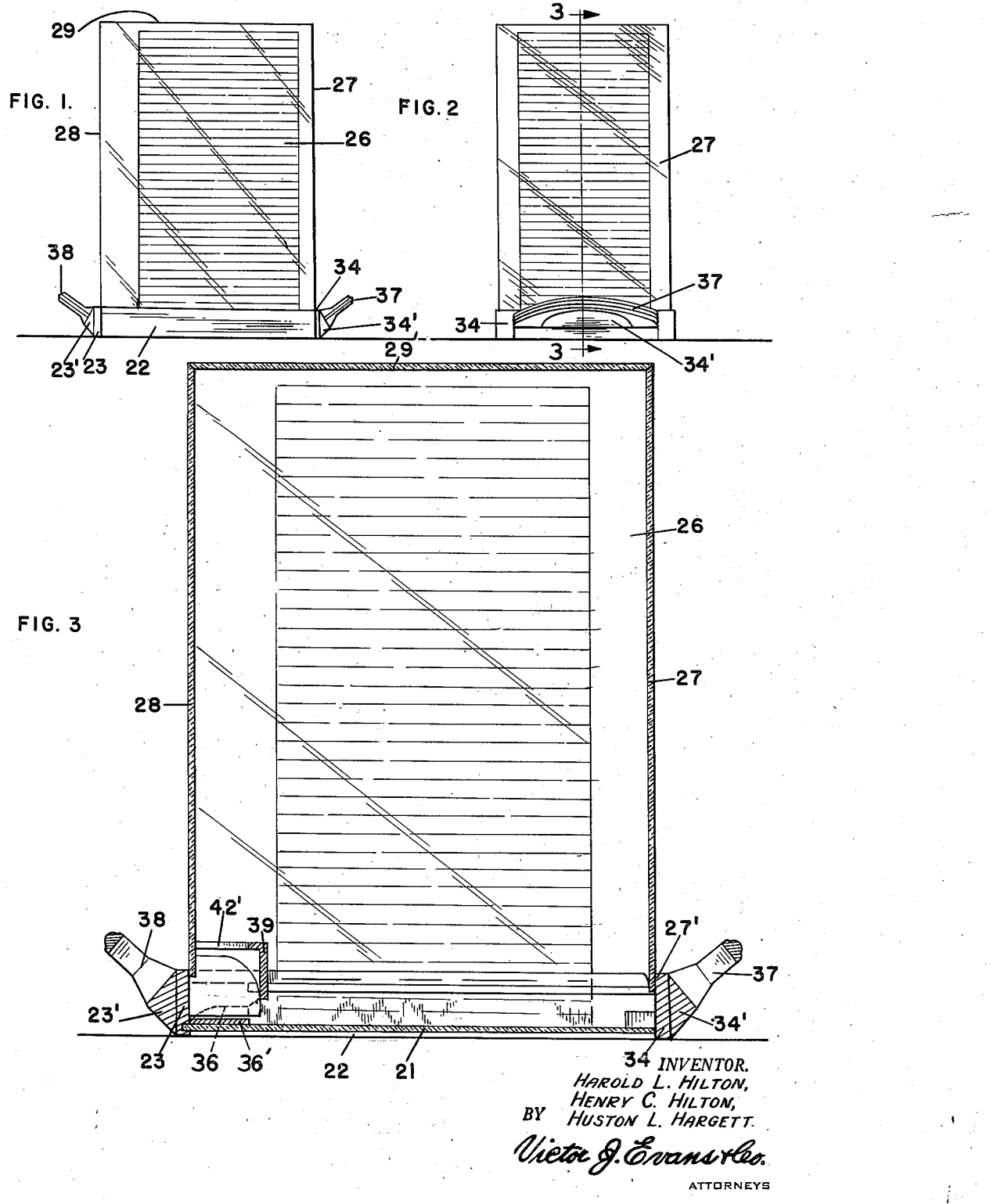

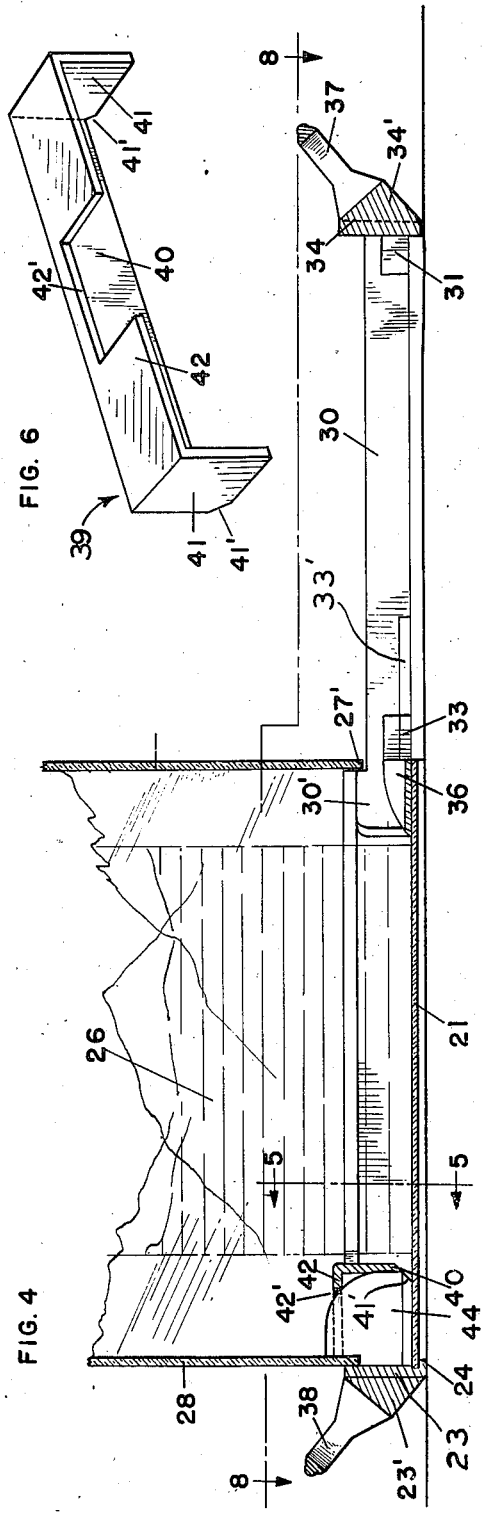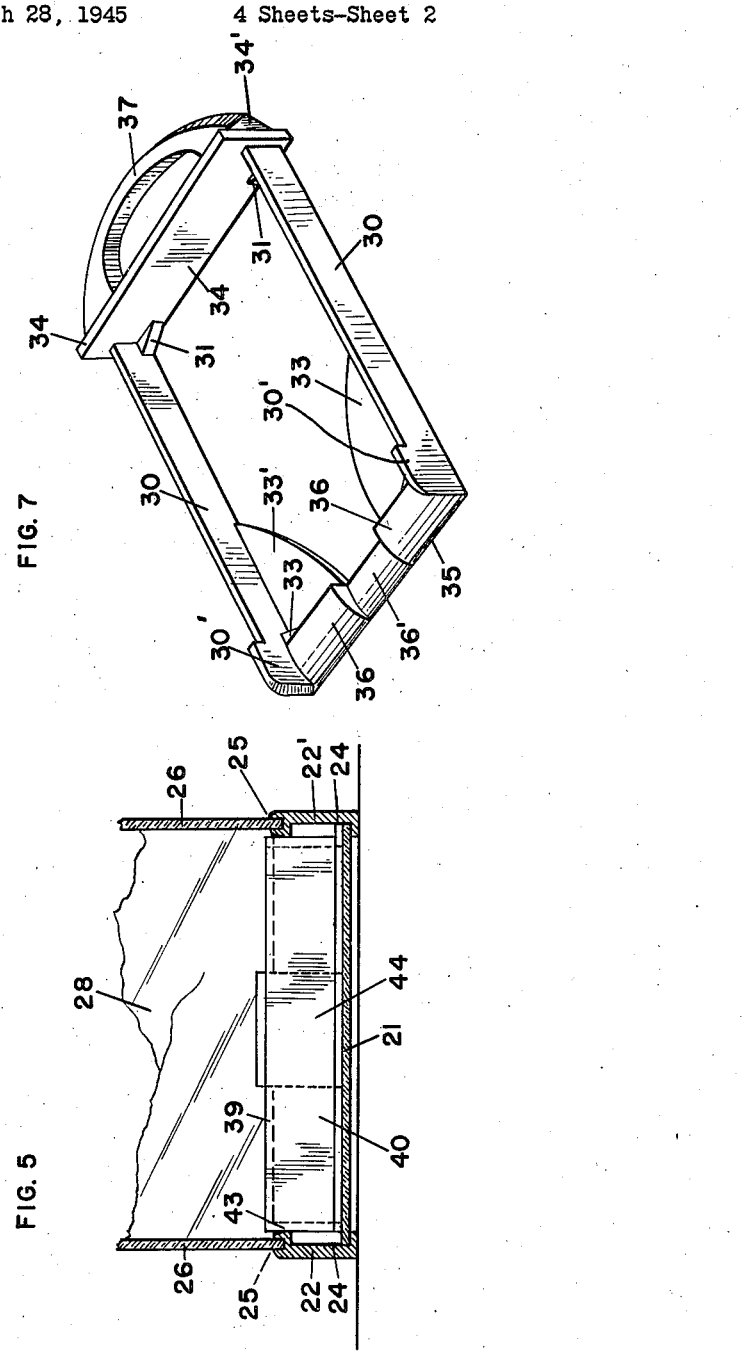

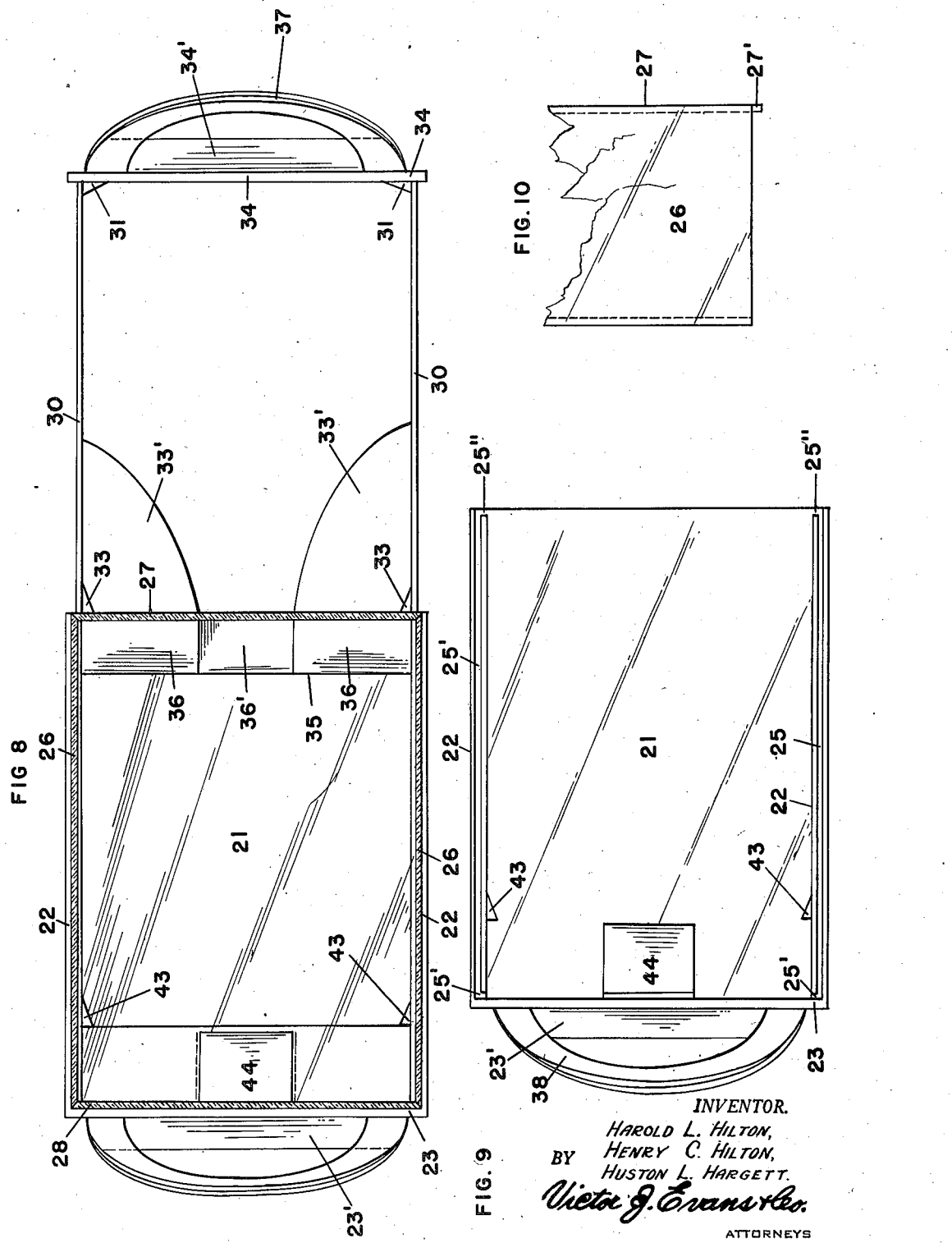

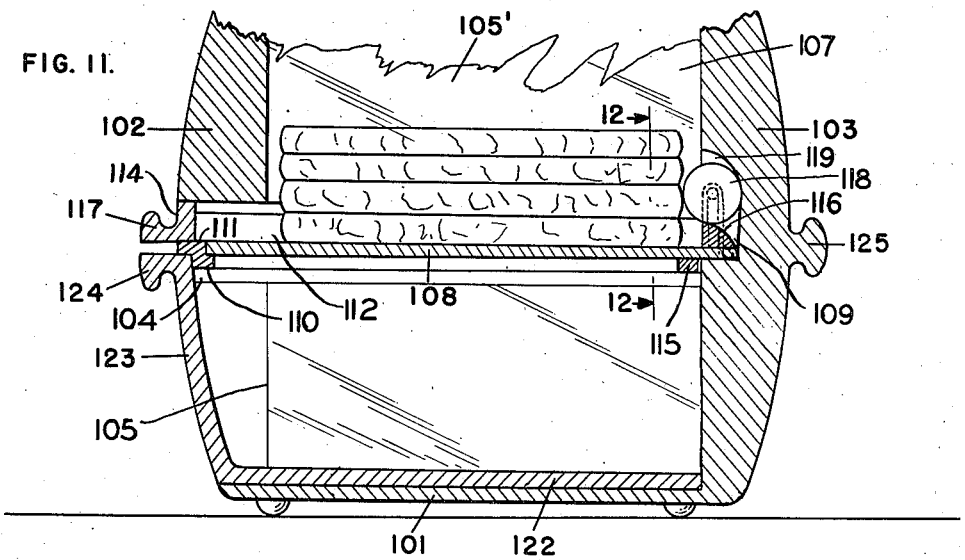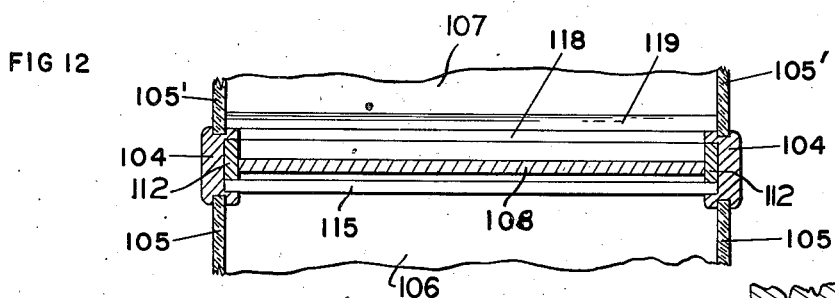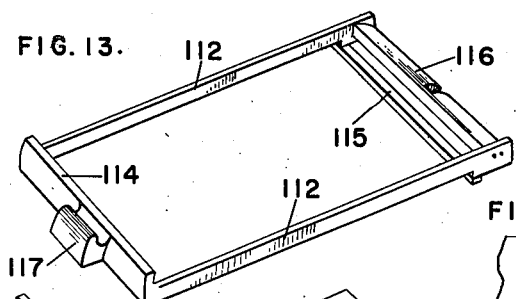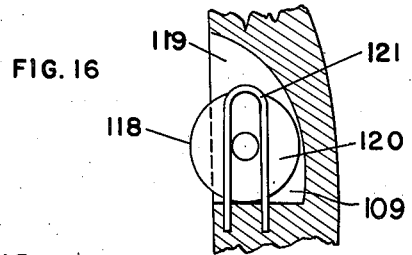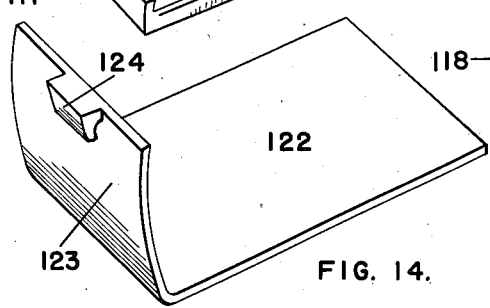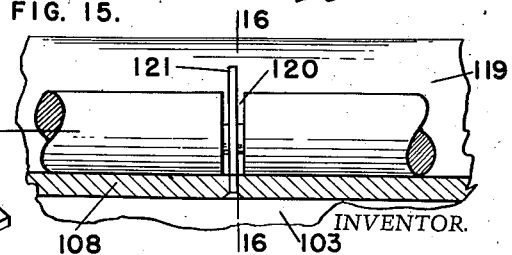

2,426,999

UNITED STATES PATENT OFFICE 2,426,999

BREAD DISPENSING DEVICE

Harold L. Hilton, Henry C. Hilton, and Huston L. Hargett, Norwood, Ohio; said Hargett assignor to said Harold L. Hilton and said Henry C. Hilton Application March 28, 1945, Serial No. 585,220

4 Claims. (Cl. 312—67)

This invention appertains to a device for the storage, display, and dispensing, of relatively flat portions of foodstuffs, such as slices of bread and the like, which is adapted to be conveniently supported, for instance, upon tables and counters in homes, restaurants, hotels, and the like, so that the portions or slices are readily accessible, are maintained in a fresh and sanitary condition, and are protected against handling by other than the individual users.

One of the several objects of the invention is to provide a device of this character with an improved dispensing means for the delivery of individual portions or slices of foodstuffs from the bottom of a stack of the same, in combination, with other means to prevent damage, by distortion or disruption, either to the portion or slice being dispensed, or to the portions or slices remaining in the stack.

Another object of the invention has to do with the provision of a cabinet or case to house a stacked supply of portions or slices of foodstuffs against contamination, or becoming stale, but to otherwise expose the foodstuffs to view for inspection purposes, the dispensing means being located in the lower side of the cabinet or case for ease of access and manipulation.

A further object of the invention is to provide a device as hereinbefore characterized, which is attractive in appearance, simple and compact in design and construction, efficient in operation, easy in dispensing means manipulation, and comparatively inexpensive to manufacture.

With these and other objects and advantages of equal importance in view, the invention resides in the certain new and useful combination, construction, and arrangement, of parts, as will be hereinafter more fully described, set forth in the appended claims, and illustrated in the accompanying drawings, in which:

Figure 1 is a side elevation of the dispensing device, in accordance with the invention;

Figure 2 is a front elevation;

Figure 3 is an enlarged, vertical, section, taken on the line 3—3 of Figure 2;

Figure 4 is a view of the lower portion of the vertical section of Figure 3, showing the dispensing unit or slide moved to its delivery position;

Figure 5 is a fragmentary, vertical, transverse, section, taken on the line 5—5 of Figure 4;

Figure 6 is a perspective view of the protective element, per se, for cooperation with the dispensing unit or slide to prevent damage to the portions or slices of foodstuffs stacked within the casing;

Figure 7 is a perspective view of the dispensing drawer or slide;

Figure 8 is a horizontal section, taken on the line 8—8 of Figure 4;

Figure 9 is a top plan view of the supporting base, with the casing and the dispensing unit or slide removed therefrom;

Figure 10 is a fragmentary side elevation of the lower front end portion of the casing, showing the depending edge of the front end wall that is cooperative with stops on the dispensing unit or slide to limit the withdrawal movement of the latter;

Figure 11 is a fragmentary vertical section taken through a modified form of cabinet or case and dispensing means therefor;

Figure 12 is a fragmentary vertical section taken through the line 12—12 of Figure 11;

Figure 13 is a perspective view of the drawer-like dispensing frame or slide;

Figure 14 is a perspective view of a receiver or support that is slidably mounted within a compartment below the dispensing frame or slide with which it is cooperative for the dispensing of a portion or slice of the foodstuff from the cabinet or case;

Figure 15 is an enlarged fragmentary sectional detail of the roller abutment for preventing displacement or disruption of the lowermost portion or slice of a stack of the foodstuff during the return of the dispensing frame or slide to normal position within the cabinet or case; and Figure 16 is vertical section taken on the line 16—16 of Figure 15.

Referring to the drawings, wherein like characters of reference denote corresponding parts throughout the several views, the embodiment of the invention, as it is exemplified therein, is generally comprised in a cabinet or case made transparent, either wholly or in part, to receive and expose to view a stack of portions or slices of foodstuffs to be dispensed; a dispensing means in the lower side of the cabinet or case to deliver portions or slices of the foodstuff singly therefrom; and a protective element cooperative with the dispensing means to prevent displacement or disruption of the lowermost portion or slice of the foodstuff during the return movement of the dispensing frame or slide to normal position within the cabinet of case.

In the form of the invention shown in Figures 1 through 10, the base is made separate from the cabinet or case and is comprised in a rectangular bottom wall 21, of a transparent material, such as sheet glass or the like, and upstanding side walls 22, and a rear end wall 23, formed of relatively narrow lengths of wood. The inner faces of the side walls 22 are channeled, as at 24, for the seating of the opposite side edges of the bottom wall 21 on the lower side walls thereof, the said edges being secured in place, as by cementing.

The casing is also of rectangular form and is comprised in side walls 26, a front wall 27, a back wall 28, and a top wall 29, all preferably of a transparent material, such as sheet glass or the like, with their adjacent edges secured together, as by cementing, to form a substantially unitary structure.

The casing, thus provided, is supported on the base, by having the lower edges of its side walls 26 seated in grooves 25 formed longitudinally in the top edges of the side walls 22, of the base, the inner sides of the grooves 25 having cutouts 25' at their rear ends, to seat the lower edge of the back wall 28 of the casing and to dispose the same abutted against the inner side of the rear end wall 23 of the base.

The dispensing unit is constituted in a bottomless, drawer-like, frame and is comprised in a pair of relatively narrow parallel side walls 30, a front end wall 34, and a rear end cross member 35, the latter having a front vertical face, constituting a back end wall. The side walls 30 are narrower than the front end wall 34, so as to have their forward ends connected thereto with their upper and lower edges spaced below and above the like edges of the same and are braced in such connection by angled corner members 31, by which arrangement, the front wall 34 is permitted to close snugly against the open end of the base and the lower margin of the front wall 27 of the casing.

The frame is slidably supported on the base by having its side walls 30 engaged in the channel 24, with their lower edges resting on the upper surface of the bottom wall 21. The cross member 35 is of a less height and of a greater thickness than those dimensions of the side walls 30 and has its flat bottom side disposed flush with the lower edges of the same. The connected ends of the side walls 30 and cross-member 35 are braced by angled corner members 33 which are formed to provide substantially triangular portions 33' at their lower ends and of an appreciably greater area. These portions 33' are relatively thin and constitute ledges, the function of which will be presently explained. The upper side of the cross-member 35 is sloped on curved lines rearwardly and downwardly from the top edge of its front vertical side to a substantial meeting with the rear edge of its flat bottom side and, medially of its ends, is formed with a cutout, which may completely sever the opposite portions 36, or allow them to remain connected by a relatively thin integral portion 36', forming the bottom of the cutout.

When in assembly on the base, the dispensing unit or slide is movable outwardly and inwardly of the open front end of the base, below the lower edge of the front wall 27 of the casing, and, in order to prevent complete withdrawal on its outward movement, stop elements, in the form of vertical offsets 30', at the rear ends of the upper edges of the side walls 30, are provided, and these engage behind the lower edge of front wall 27, at the front ends of the channels 24, to that end. For the purpose, however, the front wall 27, of the casing, is made slightly longer, in a downward direction, than the other of the vertical walls of the casing, so that its lower edge 27' is disposed in the path of movement of the stop offsets 30'; the opposite ends of the edge portion 27' being seated in cutouts 25'' at the inner sides of the forward ends of the grooves 25, in the top edges of the side walls 22 of the base. The outer side of the front end wall 34, of the dispensing unit or slide, is formed with a horizontal enlargement 34', that has an upwardly and rearwardly angled outer surface for the securement thereon of an upwardly and forwardly inclined handle 37, by means of which the unit or slide may be conveniently manipulated. The outer side of the rear end wall 23, of the base, is provided with a similar enlargement 23' to support a similarly inclined handle 38, which, together with the handle 37, may be gripped to facilitate the transport of the dispensing device from one place of use to another, or to steady the device during movements of the unit or slide.

In operation, the casing will be lifted from the base and a stack of slices of bread, sandwiches, or the like, will be positioned upon the bottom wall 21 of the base and, in part, upon the ledges 33' of the dispensing unit or slide, when the lowermost of the slices will be disposed within the confines of the latter. With the stack so placed, the casing will be replaced on the base and, thereafter, a single slice will be dispensed through the open front of the base with each outward movement of the unit or slide. In the delivery movement of the unit or slide the movement of a slice therewith is aided by the partial support of the stack on the wing-like ledges 33', which prevents a full area contact between the under side of the lowermost slice and the upper surface of the bottom wall 21, of the base, and thus reduces the retarding effect that would otherwise exist. Also, these ledges 33' facilitate the initial movement of the unit or slide which brings the front side of the cross-member 35 into the required abutting relation to the rear side of the lowermost slice and in a manner to avoid any undue distortion, i. e., compression, thereof, that might otherwise occur. In the return movement of the unit or slide, the back edge of the cross-member 35 knifes under the next lowermost slice of the stack and the curved portions 36 thereof act to lift the stack, which, when the unit or slide is nearing its normal position of rest, drops back onto the bottom wall 21, of the base, and the ledges 33', the stack being prevented from rearward movement by the contact of the lowermost of the slices with the front wall 40 of the baffle 39. With this mode of cooperation between the parts, as stated, the slices are maintained in substantially normal state as when freshly cut for stacking and are so delivered to a customer or user.

To aid in maintaining the stack of foodstuff in proper position and to prevent any distortion or disruption of the lowermost of the slices thereof, during operative movements of the drawer or slide and, particularly, during the return movement thereof to normal position, a protective member 39, of substantially rectangular form, is mounted transversely of the rear end of the base and has vertical movement imparted to it by the lifting action of the portions 36, of the cross-member 35, which passes beneath it, during the final movement of the drawer or slide to that position. As best shown in Figure 6, the member 39 is comprised in a vertical front wall 40, end walls 41, and a top wall 42, and is positioned to have the end walls 41 engaged behind lugs or shoulders 43 on the inner sides of the side walls 22 of the base. The member 39 is seated over a substantially rectangular supporting element 44, which may take the form of a wooden block, that is secured centrally on the inner side of the rear end wall 28 of the base, with its front face disposed immediately in rear of the front wall 40 so as, together with the lugs or shoulders 43, to aid in guiding the member 39 in its operative movements. The top side of the member 44 is forwardly and downwardly curved, substantially as shown, so as to present a reduced upper side portion that engages through a cutout 40', formed in the top wall 40 of the member 39, when the member is in its lower position, at which position, support is given to it by the inner edge of the cutout resting on the curved surface of the element or block 44, and the lower edges of its front and end walls 40, 41, are spaced from the bottom wall 21, of the base, sufficiently for the rear edge cross-member 35, of the unit or slide, to pass beneath the same. To aid in the passage of the cross-member 35 beneath the end walls 41, the forward ends of the lower edges of these walls are angled off, or rounded, as at 41'.

With the member 39 normally positioned on the base as stated, outward movement of the unit or slide causes the forward side of the cross-member 35 to engage the rearwardly directed edge of the lowermost slice of the stack of foodstuff, so that the slice thereafter moves with the drawer or slide, until discharged outwardly from the base. In the normal position of the unit or slide, the element 39 is supported in its elevated position on the portions 36 of the cross-member 35 and, when the unit or slide is pulled outwardly on the base and the cross-member passes from beneath it, element 39 drops back to its lower position of rest on the element or block 44, in which position, the front wall 40 forms a barrier to any undue displacement rearwardly of the lowermost slices of the foodstuff, during the return movement of the unit or slide, and, consequently, prevents any distortion or disruption of these slices by retaining them in position to override the cross-member 35 and drop back onto the bottom wall 21 of the base.

From the foregoing, it will be obvious that the device has the advantage that the foodstuff is kept fresh and free from contamination and its handling is limited to individual users. Another advantage is that it can be refilled with facility merely by lifting the casing from off the base. In the use of the device, for instance, in restaurants and the like, a further advantage is had by not providing the unit or slide with a bottom, so that a portion or slice of the foodstuff may be deposited directly onto a plate or a paper sheet, such as a napkin, supported in position beneath the path of movement of the unit or slide outwardly from the opening at the front of the base. Thus, an attendant may deliver the foodstuff to the customer in untouched condition.

Referring now to Figures 11 through 16, the modified form of the foodstuff dispenser is comprised in the cabinet or case that is made up of solid bottom, front, and back, walls 101, 102, and 103, respectively, and a solid top wall (not shown). The opposite sides of the cabinet or case are made up of open frames divided into lower and upper sections by horizontal cross members 104, with the openings below and above the cross members 104 closed by transparent panels 105, one of the upper of which, designated 105', being slidable outwardly of a slot formed in the back wall 103, to permit of access to the upper interior of the cabinet or case.

The interior of the cabinet or case is divided into lower and upper compartments 106 and 107, respectively, by a horizontally disposed shelf 108, which is supported at its back edge in a horizontal groove 109, formed in the back wall 103, and at its front edge in a groove 111, formed in the inner top edge of a horizontal member 110, extending across an opening formed in the front wall 102. This latter opening is formed by cutting away the lower portion of the front wall 102, upwardly from the front edge of the bottom wall 101 to a point in the plane of the top edges of the cross members 104 of the side frames, thus giving access to the lower compartment 106, while access is had to the upper compartment 107 through the opening normally closed by the sliding panel 105'.

Associated with the shelf 108, is the article dispenser which is comprised of an open frame formed of parallel side rails 112 that are slidably supported in longitudinal channels 113, formed in the opposed faces of the cross members 104 of the side frames of the cabinet or case. The front ends of the rails 112 are connected a wall 114 having a greater width than the rails, so as to close the opening in the front wall 102, of the cabinet or case, between the lower edge of the front wall 102 and the horizontal member 110, when the dispenser is normally disposed inwardly of the cabinet or case. The rails 112 are also connected together, adjacent their rear ends, by a cross bar 115, which closely underlies the shelf 108, and at their extreme rear ends by a cross-piece 116 that closely overlies the shelf 108, thus the rails 112 have sliding movement in the channels 113 alongside the side edges of the shelf, a hand-pull 117 being provided on the front face of the end wall 114 for the manipulation of the dispensing slide for the delivery of an article supported on the shelf, as will presently be explained.

The cross-piece 116 is substantially quarter-round in cross section and is secured on the rear ends of the rails 114 with one of its flat sides facing forwardly and its rounded surface extending rearwardly and downwardly, the latter surface having a cam-like function to move beneath and lift a roller abutment 118 that is positioned for vertical and forward movement in a recess 119 formed transversely in the back wall 103, the recess being upwardly and forwardly curved to that end. The roller abutment 118 is formed with a circumferential groove 120 at its center and this is engaged by a looped guide element 121 that is secured to the back wall 103 and functions to retain the roller abutment in its operative relation to the cross-piece 116.

In use, flat articles, such as portions or slices of foodstuffs, will be inserted into the upper compartment 107 through the opening provided in one side of the cabinet or case, by sliding the transparent panel 105' rearwardly and outwardly of the aforesaid slot in the back wall 103, and arranged in stacked relation upon the shelf 108.

Outward movement of the dispenser slide, imparted thereto from the hand-pull 117, will cause the cross-piece 116 to engage the rear side of the lowermost of the stacked articles and slide it along the shelf and outwardly of the opening at the front of the cabinet or case, where it will drop downwardly through the dispenser slide. In the return movement of the dispenser slide, the now leading edge of the cross-piece 116 engages beneath the remaining lowermost article and lifts it for the passage of the cross-piece under the article to its rearmost position. In the rearward movement of the cross-piece 116, any tendency of the lowermost article to slide in the same direction and into the recess 119 is prevented by the presence of the abutment roller 118 in its path, thus holding the article in position on the shelf 108 for its subsequent engagement by the cross-piece. In the final rearward movement of the cross-piece 116, it engages beneath the roller abutment 118 and lifts the same to an elevated position of rest upon itself. In a subsequent forward movement of the dispenser slide, the cross-piece 116 moves from beneath the roller abutment 118 which drops back to its original position. By this arrangement, the lowermost of the articles, particularly slices of bread, are protected against injury, distortion or disruption, during movements of the dispenser slide.

Mounted in the lower compartment 106 is a removable tray consisting of a flat bottom wall 122 and a vertical front wall 123, the latter having an area to close the opening in the front wall 102, below the cross member 110, the top edge of the wall 123 being disposed close to the lower edge of the front wall 114, of the dispenser slide, when normally positioned. A hand-pull 124 is provided on the outer side of the front wall 123 of the tray, for the withdrawal and replacement of the tray, the same preferably being closely associated with the hand-pull 117, of the dispenser slide, and matched therewith in a manner that both may be grasped at the same time for imparting simultaneous movements to the dispenser slide and the tray. Thus, when both are withdrawn outwardly of the cabinet or case, an article engaged by the dispenser slide will drop through the latter and onto the bottom wall 122 of the tray, so that the article need not be touched by the operator and may be conveyed in that condition on the tray to the consumer. A handgrip 125 is positioned exteriorly of the back wall 103, of the cabinet or case, in line with the hand-pulls 117, 124, of the dispenser slide and the serving tray, to steady the cabinet or case, during the manipulation of the latter as before stated.

Having thus fully described our invention, its objects and advantages, it is to be understood that various changes in form and minor structural details may be resorted to, without departing from the spirit of the invention, or its scope as claimed.

What we claim is:

1. In a dispensing device of the class described, a cabinet having an opening in the lower side of its front wall and an opening in the upper part of a side wall thereof, a shelf dividing the interior of the cabinet into a lower and an upper compartment and extending across the opening in the front wall, a slide panel closing the opening in the side wall, a dispenser slide associated with said shelf and movable relatively thereto outwardly of the portion of the front opening above the shelf to dispense the lowermost of articles arranged in stack on said shelf, a tray supported in said lower compartment and slidable outwardly of the lower portion of the front opening below the shelf, the front walls of the dispenser slide and of the tray jointly closing the front opening when normally disposed, juxtapositioned hand-pulls carried by the front walls of the dispenser slide and by the tray for independent or simultaneous manipulation of the same, and a hand grip on the back wall of the cabinet in line with the hand-pulls to steady the cabinet during the manipulation of the dispenser slide and the tray, said dispenser slide being constituted in an open horizontal frame for the discharge downwardly therethrough onto the withdrawn tray of an article withdrawn by the frame outwardly of the cabinet from the bottom of the stack.

2. The dispensing device as in claim 1, with a roller abutment disposed transversely of and immediately above the rear end of said shelf and adapted for vertical movement relatively thereto, said abutment being normally supported in its elevated position by the rear end of said dispensing slide, from which position it drops to a position in rear of the lowermost article of the stack upon the withdrawal of the dispensing slide from beneath the same, in which lowered position it acts to retain the stack against displacement rearwardly on said shelf during the return movement of the dispensing slide, during which movement the rear end of the latter passes beneath the stack and abutment.

3. In a dispensing device of the class described, a substantially rectangular base having a flat bottom wall and upstanding side and rear end walls, a bottomless draw-like dispensing frame slidably supported on the base, and a casing open at its lower end supported on the upstanding walls of the base and removable therefrom for the emplacement of a stack of sliced foodstuff upon the bottom wall of the base, the lowermost of the stacked slices being enclosed by the dispensing frame for its delivery upon withdrawal movement of the frame outwardly of the open front end of the base, a barrier mounted transversely of the rear end of the base for vertical movement relatively thereto and normally supported crosswise on the rear end of the dispensing frame in its elevated position, from which position it drops to a position in rear of the lowermost of the slices of foodstuff upon the withdrawal of the frame from beneath the same, in which lowered position it acts to retain the stack against displacement rearwardly on the bottom wall of the base, during the return movement of the frame, during which movement the rear cross-member of the frame passes beneath the stack and the barrier.

4. In a dispensing device of the class described, a casing having a horizontal wall for supporting a stack of foodstuff or the like, a bottomless draw-like dispensing frame slidably supported by said wall, the front wall of the casing having a dispensing opening through which said frame moves to dispense a member of the stack, a handle on the front end of said dispensing frame adapted to close said dispensing opening when the dispensing frame is in closed position within the casing, a barrier mounted transversely of the rear end of said horizontal wall for vertical movement relatively thereto and normally supported crosswise on the rear end of the dispensing frame in its elevated position, from which position it drops to a position in rear of the lowermost member of the stack upon the withdrawal of the frame from beneath the same, in which lowered position it acts to retain the stack against displacement rearwardly on said horizontal wall during the return movement of the frame, during which movement the rear cross-member of the frame passes beneath the stack and the barrier.

HAROLD L. HILTON.
HENRY C. HILTON.
HUSTON L. HARGETT.

REFERENCES CITED

The following references are of record in the file of this patent:

UNITED STATES PATENTS

| Number | Name | Date |
|---|---|---|
| 745,087 | Weise | Nov. 24, 1903 |
| 1,379,524 | Cassell | May 24, 1921 |
| 1,973,867 | Cook | Sept. 18, 1934 |
| 2,216,064 | Becker | Sept. 24, 1940 |